(12) United States Patent
Kelleher (10) Patent No.: US 7,598,958 B1
(45) Date of Patent: *Oct. 6, 2009

(54) MULTI-CHIP GRAPHICS PROCESSING UNIT APPARATUS, SYSTEM, AND METHOD

(75) Inventor: Brian M. Kelleher, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 374 days.

This patent is subject to a terminal disclaimer.

(21) Appl. No.: 10/992,276

(22) Filed: Nov. 17, 2004

(51) Int. Cl.
G06F 15/16 (2006.01)
G06F 15/80 (2006.01)
G06F 13/14 (2006.01)

(52) U.S. Cl. ............... 345/504; 345/502; 345/505; 345/519

(58) Field of Classification Search ............... 345/504, 345/505, 502
See application file for complete search history.

(56) References Cited

U.S. PATENT DOCUMENTS

| 5,157,765 | A | * | 10/1992 | Birk et al. ............... 345/506 |
| 5,392,394 | A | * | 2/1995 | Hamana ................ 345/504 |
| 5,757,385 | A | | 5/1998 | Narayanaswami et al. |
| 5,794,016 | A | | 8/1998 | Kelleher |
| 5,995,121 | A | * | 11/1999 | Alcorn et al. ............... 345/520 |
| 6,088,043 | A | | 7/2000 | Kelleher et al. |
| 6,178,180 | B1 | * | 1/2001 | Eng et al. ............... 370/466 |
| 6,473,086 | B1 | * | 10/2002 | Morein et al. ............... 345/505 |
| 6,627,531 | B2 | * | 9/2003 | Enquist ............... 438/622 |
| 6,630,936 | B1 | * | 10/2003 | Langendorf ............... 345/562 |
| 6,903,278 | B2 | * | 6/2005 | Sathe ............... 174/255 |
| 7,158,140 | B1 | | 1/2007 | Klebanov ............... 345/502 |
| 2003/0164830 | A1 | * | 9/2003 | Kent ............... 345/505 |
| 2003/0164834 | A1 | * | 9/2003 | Lefebvre et al. ............... 345/506 |
| 2004/0012934 | A1 | * | 1/2004 | Jafari et al. ............... 361/760 |
| 2005/0041031 | A1 | * | 2/2005 | Diard ............... 345/505 |
| 2005/0088445 | A1 | | 4/2005 | Gonzales et al. ............... 345/502 |
| 2005/0190190 | A1 | * | 9/2005 | Diard et al. ............... 345/502 |

* cited by examiner

Primary Examiner—Kee M Tung
Assistant Examiner—Jacinta Crawford
(74) Attorney, Agent, or Firm—Cooley Godward Kronish LLP (57) ABSTRACT

A multi-chip graphics system includes a master chip and a slave chip coupled by an interlink. The slave chip performs a graphics processing operation in parallel with the master chip, improving the performance of the master chip. In one embodiment, an individual graphics processing unit (GPU) chip includes a normal operational mode, a master mode, and a slave mode to permit an individual GPU chip to be used as individual processor or to be packaged as part of a master/slave pair.

19 Claims, 9 Drawing Sheets

MULTI-CHIP GRAPHICS PROCESSING UNIT APPARATUS, SYSTEM, AND METHOD

RELATED APPLICATIONS

This application is related to the commonly owned patent application entitled "Apparatus, System, and Method for Joint Processing in Graphics Processing Units" application Ser. No. 10/991,540, filed concurrently, as the contents of which are hereby incorporated by reference.

FIELD OF THE INVENTION

The present invention is generally related to improving the performance of a graphics processing unit. More particularly, the present invention is directed to a graphics processing unit chip that may be used as an individual processor or packaged with another graphics processing unit chip as a multi-chip module to improve performance.

BACKGROUND OF THE INVENTION

Figure 1:
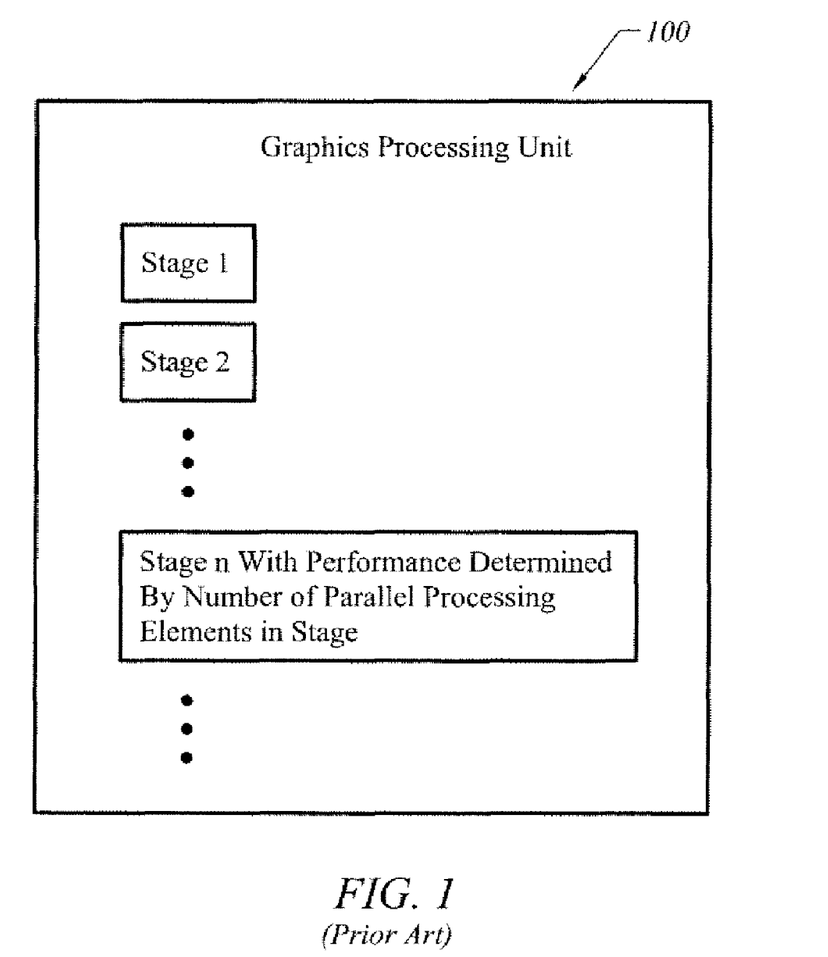
FIG. 1 is a block diagram of a prior art graphics processing unit.

The design of a graphics processing unit (GPU) chip includes many different tradeoffs. FIG. 1 is a block diagram of a prior art GPU chip 100. A GPU is typically implemented as a sequence of pipelined stages, where each stage is dedicated to performing a particular graphics processing operation. Some stages, such as stage n, can be implemented by two or more individual elements that process graphics data in parallel. Thus, in some cases the processing operation performed by a stage may be divided up and performed in parallel. For example, stage n may be a pixel shader stage configured to balance a processing load for shading groups of pixels across an integer number, m, of shader pipelines (not shown) within stage n.

The performance (e.g., speed and/or processing quality) of stage n can be improved by increasing the number of elements that process graphics data in parallel. However, increasing the number of parallel processing elements in stage n has the drawback that the chip area devoted to stage n increases. This is illustrated in FIG. 1 by the larger size of stage n compared with other stages. A larger chip size, in turn, increases the cost to produce GPU chip 100.

The production cost of GPU chip 100 also depends upon the production volume. In particular, there are economies of scale associated with the design, manufacture, and marketing of GPU chips. As a result, the cost of a GPU chip also increases if the production volume decreases below some minimum level.

It is difficult for GPU manufacturers to design a chip that achieves a satisfactory tradeoff of cost and performance for a broad cross-section of consumers. The GPU market is highly segmented in terms of the tastes and preferences of consumers. A small portion of the market is willing to pay a significant premium for extremely high performance. However, a large portion of the market is cost sensitive and does not require the highest level of performance.

Conventionally, GPU manufacturers have difficulty simultaneously serving the different market segments. A GPU chip designed only for the market segment demanding the highest performance would be too expensive for price-sensitive consumers and may also have a production run that has too small a volume to take full advantage of economies of scale. Conversely, a GPU chip designed for price-sensitive consumers will not have the performance desired by high-end consumers.

Therefore, what is desired in an improved apparatus, system, and method for designing GPU chips to service different market segments.

SUMMARY OF THE INVENTION

A graphics processing unit chip is disclosed that may be used as an individual processor or packaged as a multi-chip module having a master/slave pair with improved processing performance. A packaged multi-chip master/slave pair includes a high bandwidth interlink for transferring data from the master chip to the slave chip and returning processed data from the slave chip to the master chip. The master chip receives a graphics command string and generates a graphics output. The master chip utilizes the slave chip to process, in parallel, data for one or more stages of the graphics pipeline of the master chip.

One embodiment of a multi-chip graphics system comprises: a master chip configured to receive graphics instructions and generate a graphics output, the master chip including a first interlink interface; a slave chip for performing processing of graphics data, the slave chip including a second interlink interface, the slave chip receiving graphics data from the master chip and processing the graphics data in parallel on behalf of at least one stage of the master chip to improve performance of the master chip; the master chip and the slave chip packaged with a high bandwidth interlink for exchanging data.

BRIEF DESCRIPTION OF THE FIGURES

The invention is more fully appreciated in connection with the following detailed description taken in conjunction with the accompanying drawings, in which.

DETAILED DESCRIPTION OF THE INVENTION

Figure 2:
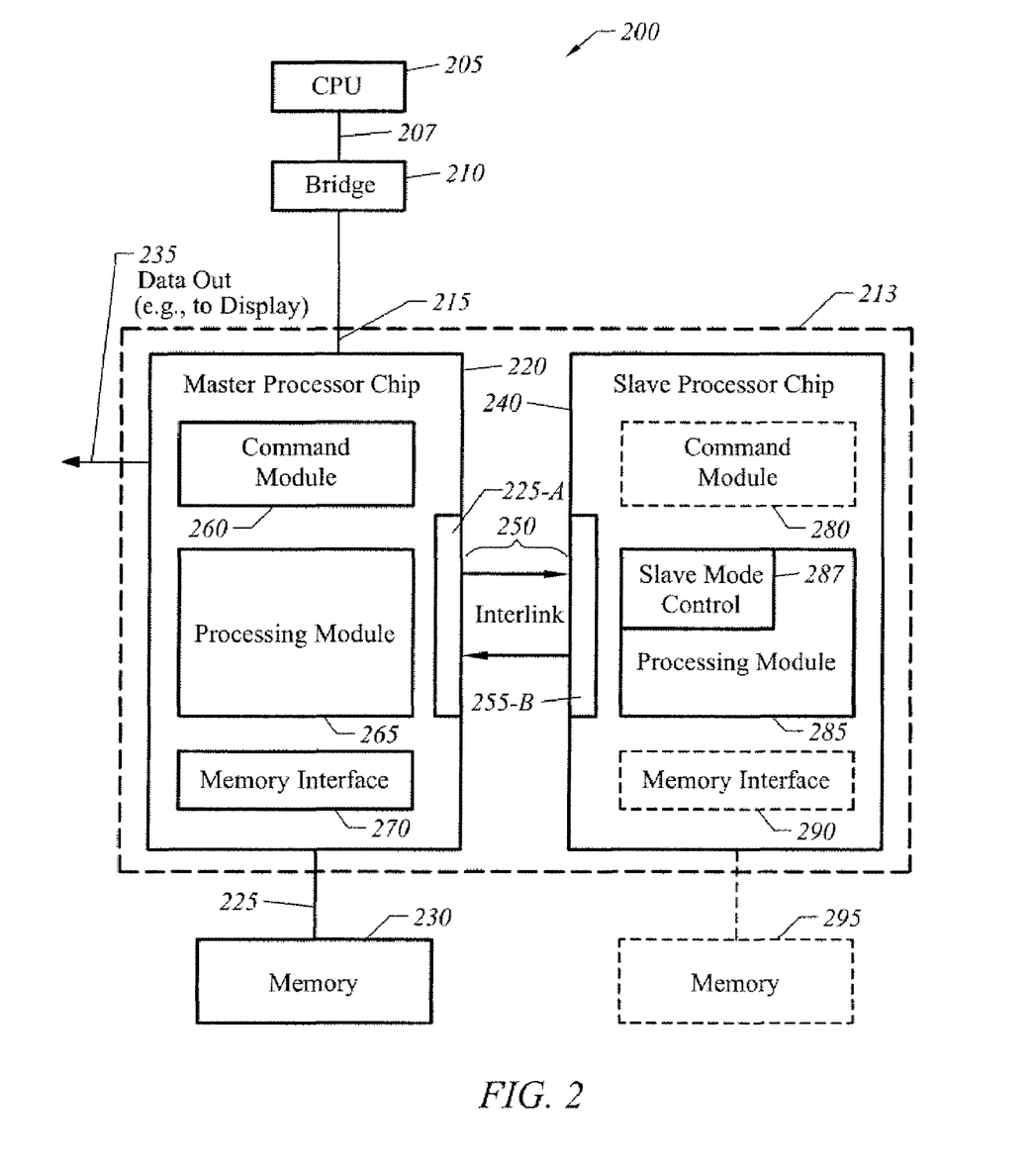
FIG. 2 is a block diagram of a graphics system having a master graphics processing unit chip and a slave graphics processing unit chip in accordance with one embodiment of the present invention.

FIG. 2 is a block diagram of a multi-chip graphics system 200 in accordance with one embodiment of the present invention. A central processing unit (CPU) 205 is coupled to a graphics processing unit (GPU) chip 220 through a suitable bus interface. As used in this application a "chip" is an integrated circuit that resides on a die, with the die packaged to permit electrical power and signal connections to be made to the integrated circuit.

In one embodiment, a bridge 210, such as a bridge chipset, is used to couple CPU 205 to GPU chip 220. For example, a front side bus 207 may be used to communicatively couple CPU 205 to bridge 210 whereas a performance component interface (PCI)-Express bus 215 may be used to communicatively couple GPU chip 220 to bridge 210. PCI-Express is a high speed interface standard promoted by the PCI-SIG organization and defined by the PCI-Express specification published by PCI-SIG, the contents of which are hereby incorporated by reference. A graphics memory 230 is communicatively coupled to GPU chip 220 via a graphics memory bus 225. A memory interface 270 provides an interface to memory 230. Graphics memory 230 may, for example, comprise a frame buffer.

GPU chip 220 receives a graphics command stream from CPU 205 to generate graphical images. The graphics commands may, for example, originate in driver software (not shown) residing within a memory associated with CPU 205. The output 235 of GPU chip 220 may, for example, include data that is output to a display.

GPU chip 220 includes a command module 260. Command module 260 receives a graphics command stream from CPU 205, reads and parses the command string, and distributes work to the other stages within GPU chip 220. At least one of the stages in the graphics pipeline of GPU chip 220 is a processing module 265 that performs a processing operation that may be performed in parallel. One example is a shader stage. Shader stages in high performance GPUs are typically arranged as groups of shader pipelines along with logic that permits a load balancing operation in which the shading work is distributed between the shader pipelines. Slave GPU chip 240 is packaged with GPU chip 220 as a multi-chip module 213 that may be used as a replacement for an individual GPU chip. As described below in more detail, in one embodiment multi-chip module 213 may include a package adapted to be mounted onto a board.

Slave GPU chip 240 includes a processing module 285 capable of performing a processing function that is compatible with that performed by processing module 265. This permits, for example, two GPU's from the same or related product lines to be used in system 200. Thus, for example, slave GPU chip 240 may have its own command module 280 and memory interface 290. However, as indicated by the dashed lines in FIG. 2, when the interlink 250 is active command module 280 is inactive. In one embodiment, in the slave mode memory interface 290 is inactive. This configuration provides the benefit of facilitating a system having a single unified memory architecture utilizing one memory 230. A single unified memory architecture utilizes bandwidth efficiently. Additionally, a single unified memory architecture provides the benefit that it does not require modifications to driver software. However, it will be understood that in an alternate embodiment that memory interface 290 remains active, permitting a second memory 295 (illustrated in phantom) to be utilized in the slave mode.

GPU chip 220 acts as the master processor and utilizes processing module 285 as an additional processing resource that is used in parallel with processing module 265. In one embodiment slave GPU chip 240 also receives clock signals from GPU chip 220 to facilitate synchronization of slave GPU chip 240 to GPU chip 220. In the slave mode, a load balancing module (not shown) within processing module 265 determines a distribution of work to be performed by processing modules 265 and 285 and transfers a portion of the graphics data that it receives to processing module 285. Thus for example, if processing modules 265 and 285 are substantially identical, about half of the processing that would ordinarily be performed by processing module 265 is off-loaded to processing module 285, permitting an approximately two-fold improvement in performance (e.g., speed or quality), assuming that processing modules 265 and 285 have a similar number of operable processing elements.

Slave GPU chip 240 is coupled to GPU chip 220 via an interlink 250. Interlink 250 is preferably a low latency, high bandwidth link. Interlink 250 should have a sufficiently low latency that the round trip delay time associated with sending and receiving data on interlink 250 does not exceed a timing margin for processing data. Additionally, the aggregate bandwidth of interlink 250 is preferably comparable to that of internal buses used to transmit graphics data of the type processed by graphics processing module 265. For example, the bandwidth of interlink 250 is preferably sufficiently large to accommodate sending and receiving data corresponding to the full input/output data width of processing module 285. These attributes of interlink 250 facilitate seamlessly offloading processing tasks to slave GPU chip 240 as if processing module 285 of slave GPU chip 240 was an internal extension of processing module 265 of GPU chip 220.

In one embodiment interlink 250 includes a plurality of sub-links (not shown) that include corresponding signal paths (e.g., high bandwidth conductive paths). The number of sub-links required will depend upon the data bandwidth associated with transferring data from GPU chip outbound to slave GPU chip 240 and the data bandwidth associated with returning processed data from slave GPU chip 240. Additionally, the number of sub-links required will also depend upon the bandwidth required for memory accesses between slave GPU chip 240 and memory 230. As an illustrative example, in one implementation in which interlink 250 is used to transfer shader data, the bandwidth required corresponds to a bandwidth for transmitting data from a large number of conventional pins (e.g., 50 to 200 conventional pins).

Interlink 250 is supported by interface 255-A in GPU chip 220 and interface 255-B within slave GPU chip 240. Each interface may, for example, determine an order in which outbound data is sent across the interlink to the other side. Conversely, each interface may determine an order in which received data is provided to the receiving processor. In one embodiment, each interface 255-A and 255-B supports parallel-to-serial data conversion for data to be sent out on interlink 250 along with serial-to-parallel data conversion of data received from interlink 250. Transmitting data in serial form on high bandwidth signal paths is desirable to reduce the total number of signal paths and corresponding interconnects that must be formed for interlink 250.

In one embodiment GPU chip 220 and slave GPU chip 240 are formed from the same product design or with product designs having compatible processing modules 265 and 285. In this embodiment, a manufactured GPU chip is designed to support a normal mode of operation, a master mode of operation, and a slave mode of operation. In the normal mode of operation a GPU chip is operable as an individual processor and may be packaged as an individual processor. However, two GPU chips may be packaged as a multi-chip module 213 in which one of the GPU chips acts as the master and the other acts as the slave. The multi-chip module 213, which utilizes the resources of processor module 285 in parallel with processor module 265, has improved performance compared with an individual GPU chip. Note that in the multi-chip module 213 only the master GPU 220 receives graphics instructions from CPU 205. As a result, replacing a single GPU chip with a multi-chip module having a master/slave pair of GPUs is a seamless change to driver software within CPU 205. That is, the driver software perceives the master/slave pair as a single GPU. Thus with one type of GPU chip two different markets can be served by packaging either a single GPU chip or by packaging a master/slave pair of GPU chips for higher performance.

A variety of techniques can be used to establish a master-slave relationship between GPU chip 220 and slave GPU chip 240 in a packaged multi-chip module 213. For example, one or both of the chips may be programmed prior to packaging (e.g., by programming a bit in a permanent memory). Alternatively, one or both of the chips may determine that they are the master or the slave by detecting whether they are receiving command instructions from a command module and determining whether interlink 250 is active. Additionally, a messaging technique may be used. For example, GPU chip 220 and slave GPU chip 240 may exchange messages to set up a master-slave relationship. Hardware or software within each processing module may be included to support the establishment of a master-slave relationship. For example, a slave mode control module 287 may be included in slave GPU chip 240 to establish a slave condition if one or more slave conditions are present, such as detecting a load on interlink 250. Similarly a master mode control module (not shown) within in GPU chip 220 may be included to establish a master condition if one or more master conditions are present.

Figure 3:
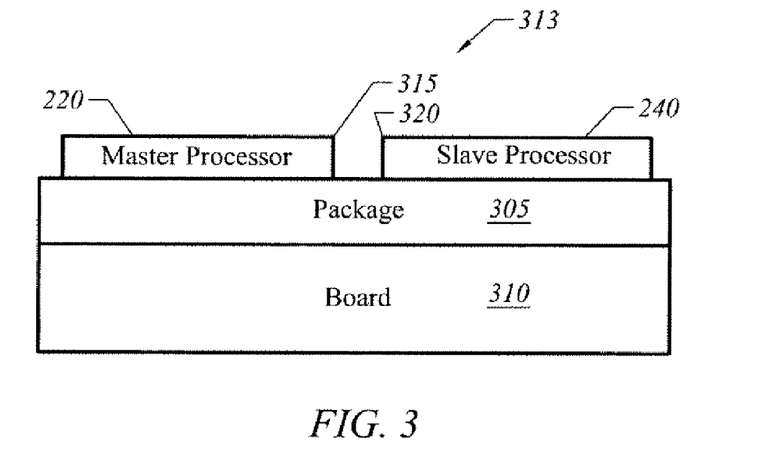
FIG. 3 is an illustrative side view illustrating a packaged multi-chip graphics system in accordance with one embodiment of the present invention.

Referring to FIG. 3, in one embodiment GPU chip 240 and GPU chip 220 are packaged in an edge-to-edge multi-chip module 313 with the interlink formed by fabricating signal leads between the chips. GPU chip 240 and GPU chip 220 are packaged on top of a common multi-chip package 305 that is then placed on a board 310. However, high performance GPUs process large amounts of data, particularly for the shader stage. An edge-to-edge configuration permits only a comparatively small number of low latency sub-links to be formed between edges 315 and 320. Additionally, an edge-to-edge configuration has an associated internal (chip) propagation delay for signals to propagate between the periphery of the chip to internal source or destination points. As a result, a drawback of an edge-to-edge packaging configuration is that it may not permit an interlink 250 to be formed having sufficient latency and bandwidth attributes required to support parallel processing of stages in high performance GPUs requiring a large bandwidth for data transfer, such as shader stages.

In one embodiment, multi-chip module 213 has slave GPU chip 240 and GPU chip 220 packaged parallel and in close proximity to each other across a substantial portion of the area of each chip. This configuration of parallel and closely spaced chips facilitates using leads, such as vias, to form a substantial number of parallel sublinks that are distributed across the area of each chip with a low latency per sub-link and with a high total aggregate bandwidth.

Figure 4:
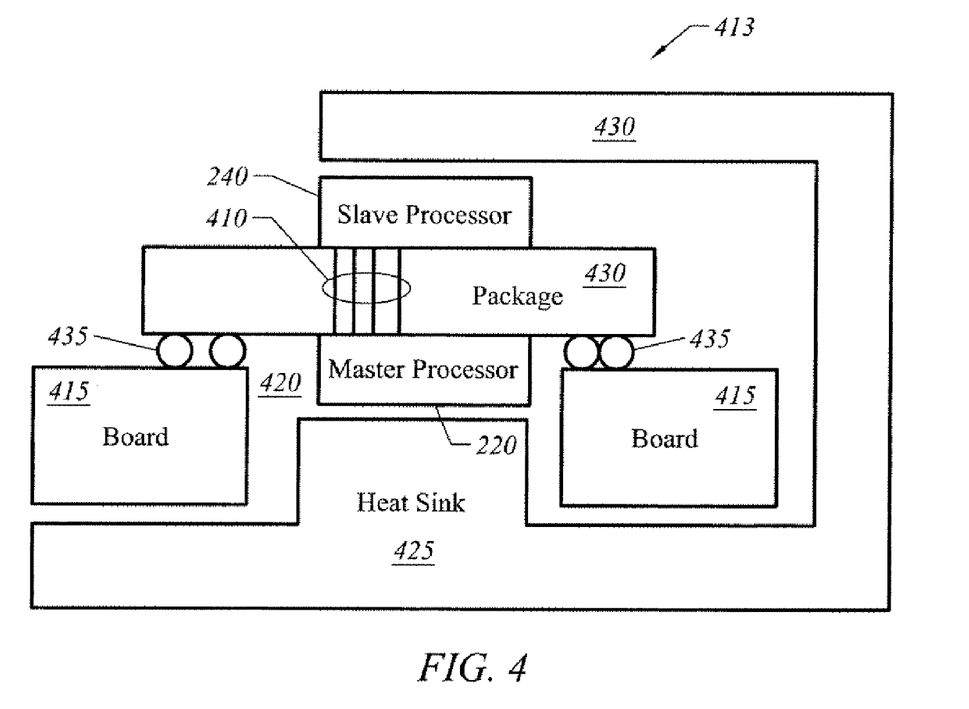
FIG. 4 is an illustrative side view illustrating a packaged multi-chip graphics system in accordance with one embodiment of the present invention.

FIG. 4 shows an embodiment of a multi-chip module 413 for implementing a low latency, high bandwidth interlink 250. In this embodiment GPU chip 220 and slave GPU 240 are flip-chip mounted to opposite sides of a package 405. The package 405 may, for example, comprise a coreless substrate. Core-less substrates utilize a stacked build-up process to form the substrate. A core-less substrate utilizes only the build up layers to form interconnects and hence lacks a conventional core. Core-less substrates utilize micro-vias that permit an increased density (pitch) of vias, have less signal attenuation due to the lower package thickness, have reduced inductance, facilitate high speed data transfer, and provide other benefits. Conductive vias 410 within package 405 are used to form interlink 250. The vias 410 may be distributed across the area of GPU chip 220 and slave GPU 240 to provide a combined (total) bandwidth that scales with the number of vias. The transit distance for signals to travel from one processor to another corresponds to the thickness of package 405. In one embodiment, the board 415 onto which the package is mounted has a hole 420 to permit both GPU chip 220 and slave processor 240 to be cooled to a heat sink 425. In one embodiment heat sink 425 includes a wrap-around section 430 for cooling slave GPU 240. Package 405 may be mounted to board 415 using conventional bonding processes, such as by using solder balls 435.

Figure 5:
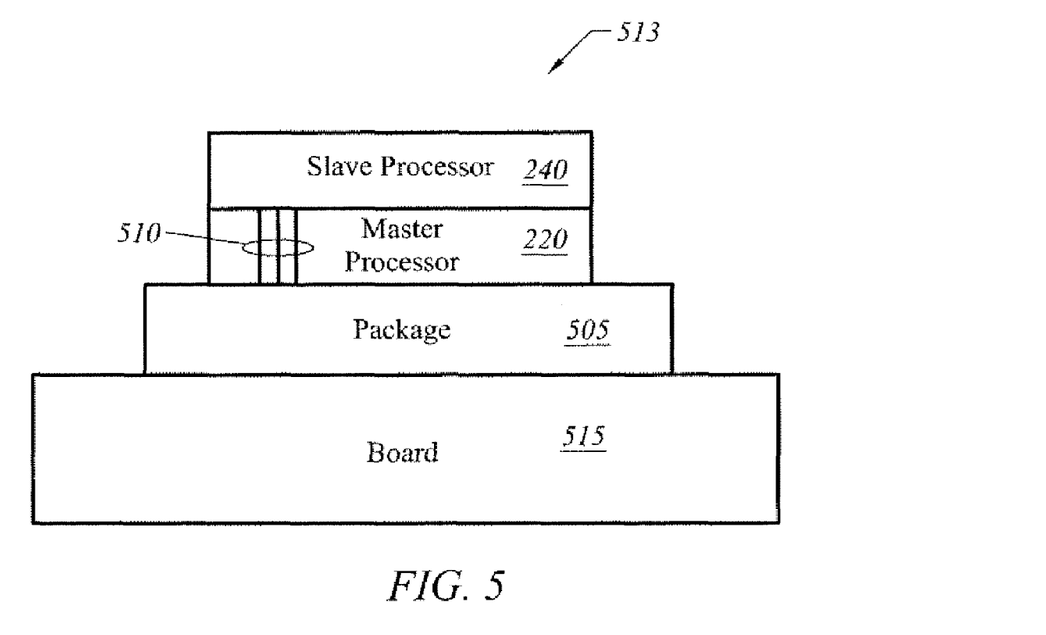
FIG. 5 is an illustrative side view illustrating a packaged multi-chip graphics system in accordance with one embodiment of the present invention.

FIG. 5 shows an embodiment of a multi-chip module 513 in which GPU chip 220 and slave GPU chip 240 are packaged on top of each other. In this embodiment, vias 510 may be formed in one of the dies to form conductive paths for interlink 250. The other die is then bonded on top of the other using three-dimensional packaging techniques. The bonded die are then mounted to a package 505, which may then be attached to a board 515. Additional power and signal connections may be formed to slave GPU chip 240 using additional vias or wire bond connections. Die-to-die bonding is a type of three-dimensional packaging that is typically used in the system-on-a-chip (SOC) art to bond memory chips to a processor. In particular, three-dimensional packaging techniques are conventionally used to form a hybrid integrated circuit in which different types of electronic modules are packaged on top of each other to form a hybrid circuit that emulates a system-on-a-chip. For example, Ziptronix, Inc., of Morrisville, N.C. provides three dimensional wafer bonding and interconnect services that permit a non-adhesive bond to be formed between a die and a corresponding interconnect on another chip. Similarly, Xanoptix of Merrimack, N.H. offers three-dimensional packaging services.

Figure 6:
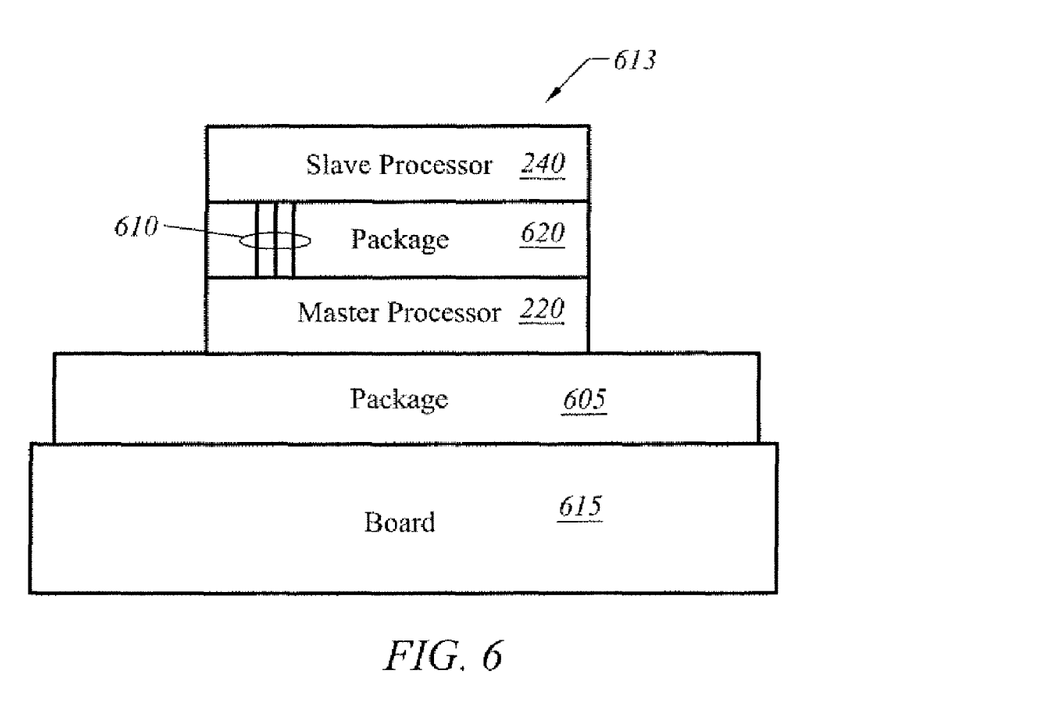
FIG. 6 is an illustrative side view illustrating a packaged multi-chip graphics system in accordance with one embodiment of the present invention.

FIG. 6 illustrates a package-on-package (POP) multi-chip module 613. In this configuration the slave GPU chip 240 is mounted to a package 620 including vias 610. The master GPU chip is mounted to a package 605. Package 620 is mounted on top of master processor 220. Package 605 may be attached a board 615.

High performance GPU chips dissipate a substantial amount of heat. As an illustrative example, a high performance GPU chip may dissipate 50 to 75 watts. Consequently, packaging two GPU chips in a multi-chip module 213 will increase heat dissipation. Thermal modeling is desirable to optimize the heat sinking and cooling for multi-chip module 213.

One application of the present invention is to improve shader performance. A shader stage is one of the larger (by area) stages of a GPU. Increasing the size of the shader stage to meet the performance demands of the market segment demanding the highest GPU performance is conventionally difficult to do in an economic manner. However, in accordance with the present invention, two GPU chips may be packaged together for improved shader performance.

Figure 7:
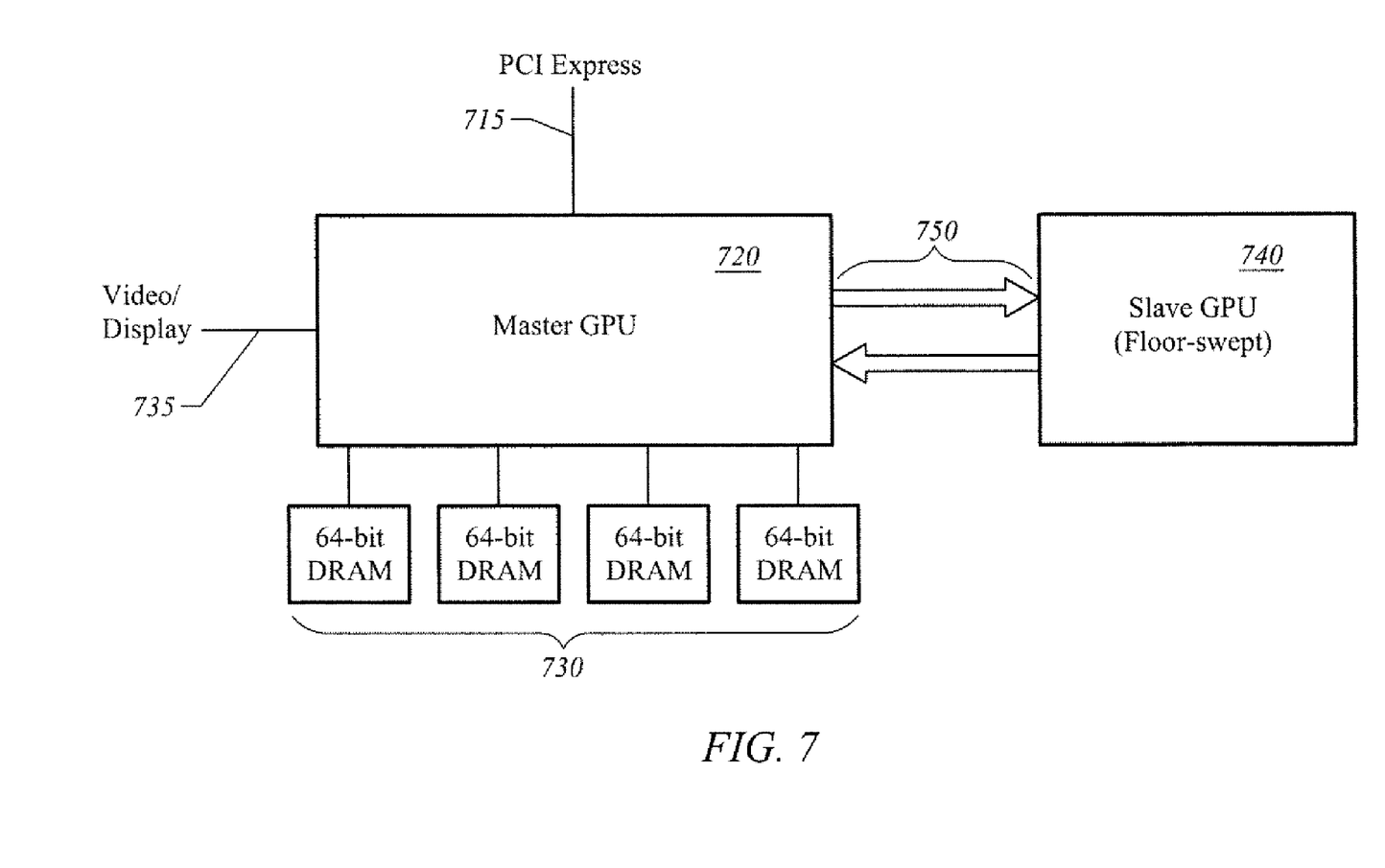
FIG. 7 is a block diagram illustrating a graphics system having a master graphics processing unit chip and a slave graphics processing unit chip in accordance with one embodiment of the present invention.

FIG. 7 is a block diagram of an exemplary multi-chip graphics system with improved shader performance in accordance with one embodiment of the present invention. A master GPU chip 720 has a PCI Express interface 715 for receiving graphics commands from a central processing unit (not shown) and an output interface 735 for outputting graphical images. A memory 730 is coupled to GPU chip 720. Slave GPU chip 740 is coupled to master GPU 720 by interlink 750.

Figure 8:
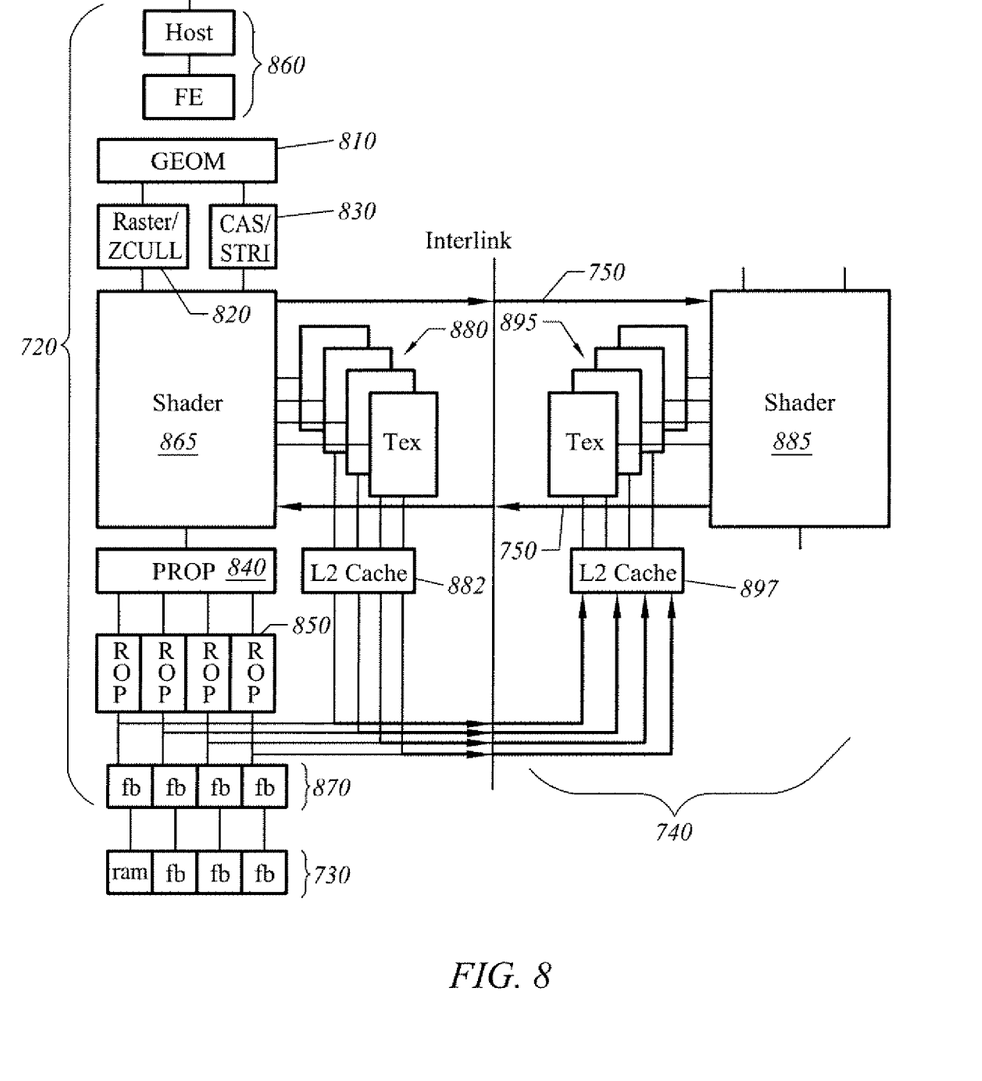
FIG. 8 is a block diagram illustrating in more detail some of the components of FIG. 7.

FIG. 8 is a block diagram showing some of the components within master GPU chip 720 and slave GPU chip 740 in more detail. Master GPU chip 720 includes a host and front end stage acting as a command module 860. A geometry stage 810 performs geometry processing. A raster stage 820 rasterizes primitives and also performs a Z culling operation to cull out occluded primitives. A CAS/STRI module is a color assembly/shader triangle module that receives attributes, such as colors, from the geometry state and calculates plane equations for interpolation by the shader stage 865. Shader stage 865 includes a plurality of shader pipelines for pixel shading. In one embodiment shader stage 865 includes 24 pixel shader pipelines. Raster operations (ROP) functions are performed in a pre raster operations stage 840 and associated raster operation stages 850. A frame buffer interface 870 serves as a memory interface to memory 730. Texture modules 880 and cache memory 882 are utilized by shader 865 for texture mapping operations.

Slave GPU chip 740 includes a shader stage 885 having a plurality of shader pipelines, texture modules 895, and cache 897. In one embodiment, shader stage 885 includes 24 shader pipelines such that slave GPU chip 740 doubles the shading power of a master GPU chip 720 having 24 shader pipelines.

Data in a shader queue is routed to the shader pipelines of slave GPU 740. Texture cache requests and return texture data are also routed over interlink 750. Final pixel results generated by shader 885 are routed back to master GPU 720.

In one embodiment slave GPU chip 740 includes analogous stages to that of master GPU chip 720. However, only those stages required to establish interlink 750 and perform the shading operation need to be free from defects. Thus while shader stage 885, texture modules 895, and cache 897 are fully functional, slave GPU chip 740 does not require a fully functional command module (not shown), geometry stage (not shown), or raster stage (not shown). As a result, slave GPU chip 740 may be a GPU similar in design to master GPU chip 720 but that is identified as a "floorswept" unit having a defect that renders it unusable as a stand-alone or master GPU.

Figure 9:
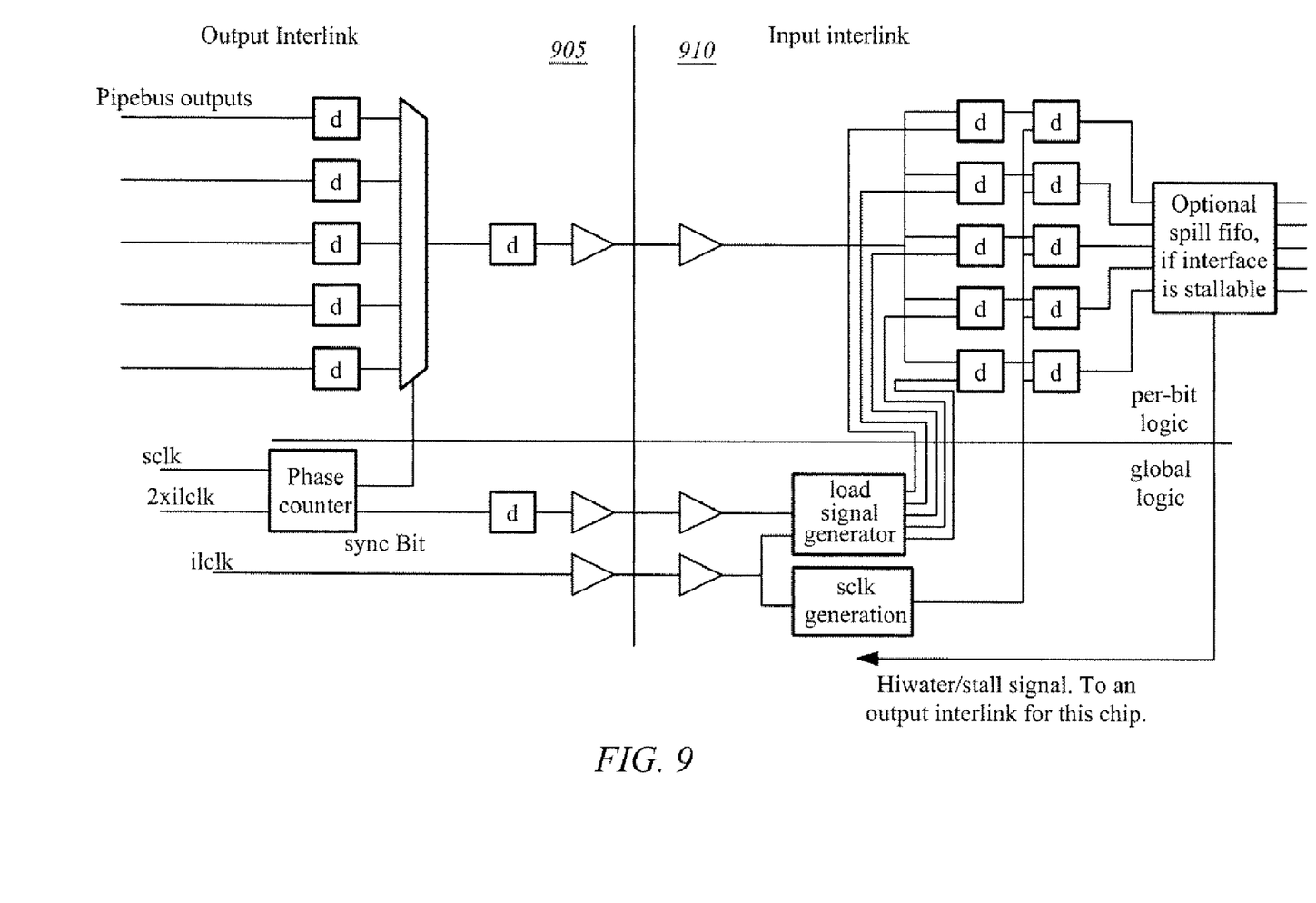
FIG. 9 is a block diagram illustrating some of the components of an interlink interface for use in the embodiment of FIG. 7.

FIG. 9 illustrates an exemplary physical interface for forming part of the interlink 750 between the master GPU chip and the slave GPU chip. In one embodiment the interlink is formed from many dedicated point-to-point unidirectional signals running at trans GHz frequencies. On output side 905 inputs from a plurality of shader pipeline buses are staged in a staging phase and are then serialized. A sync bit is generated to identify to the other side that a load is present. Additionally, a clock signal (iclk) is transmitted as an interlink clock to permit clock recovery/synchronization. At input side 910 received data is deserialized, staged, and sent to the graphics pipeline. Note that at input side 910 the local interlink clock, sclk, may be generated from iclk but run at a different rate than iclk.

In light of the previous discussion, it can be understood that the present invention provides several cost and performance advantages. As an illustrative example, a GPU manufacturer might design a GPU chip to have high performance attributes but with a processing module, such as a shader, selected to achieve a reasonable tradeoff between performance, production volumes, and price point for the general market. Extremely high performance (e.g., about a factor of two improvement) of one or more stages can be achieved by packaging some of the GPU chips as master/slave pairs. Moreover, some or all of the master/slave papers can use "floorswept" GPUs as the slave GPU, thereby reducing manufacturing cost.

While an exemplary embodiment of the present invention has been described as having a single master GPU chip and a single slave GPU chip, it will be understood that numerous extensions are contemplated. For example, in some applications it may be desirable to utilize two or more slave GPUs for each master GPU. Moreover, while examples have been described in which the slave GPU performs a processing operation in parallel for one of the stages of the master GPU, more generally one or more operable stages within slave GPU may be used to extend the performance of corresponding stages within the master GPU.

Figure 10:
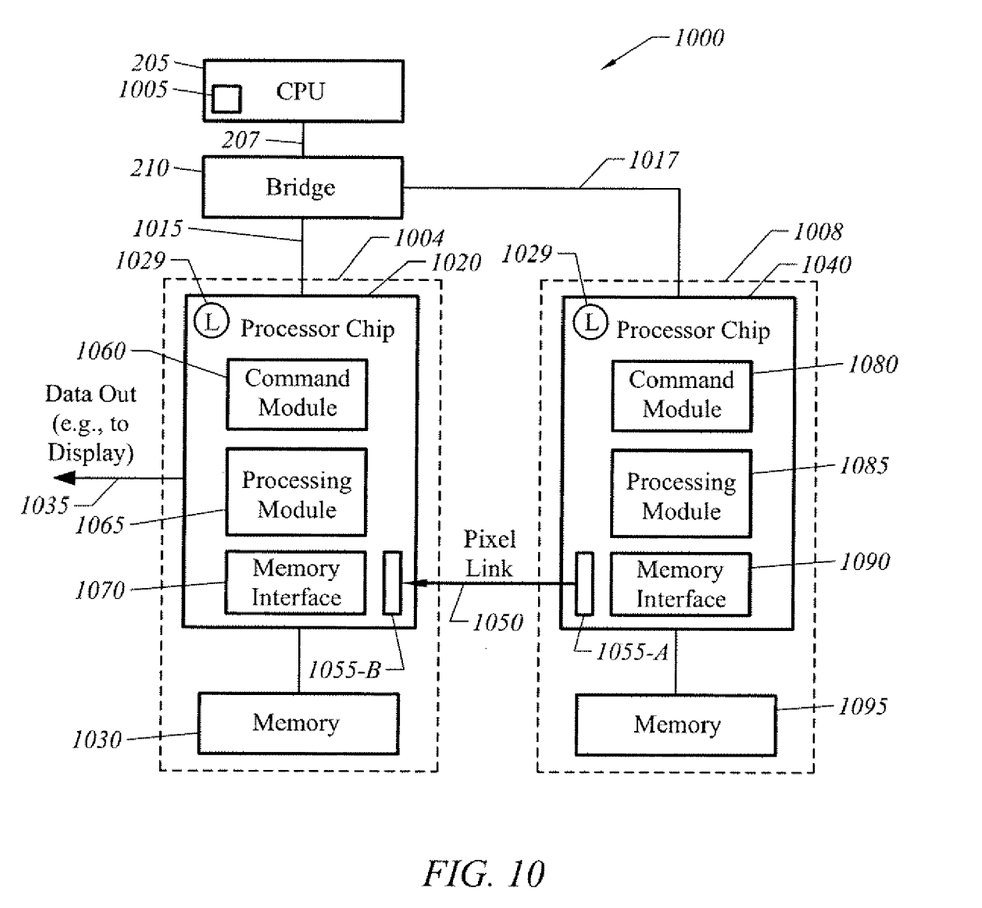
FIG. 10 is a block diagram illustrating a graphics system having distributed processing of pixels in two processors in accordance with one embodiment of the present invention.

FIG. 10 illustrates an alternate embodiment of a graphic system 1000 with intra-frame load balancing in which a first GPU chip 1020 and a second GPU chip 1040 process different portions of each frame. First GPU chip 1020 is the master GPU and merges data processed by each GPU for different portions of a frame into a single display output 1035. GPU chip 1040 is the slave GPU. In one embodiment, each GPU chip 1020 and 1040 has a normal mode of operation as an individual stand-alone GPU, a master mode, and a slave mode, permitting an individual GPU chip to be used either alone or as part of a pair for higher performance. The mode of operation may be selected using a variety of techniques, such as by using instructions from a CPU (e.g., from a driver) to instruct a GPU chip if it is operating in a slave mode or a master mode. The normal operating mode may, for example, be a default mode.

Each GPU chip 1020 and 1040 is connected to bridge 210 via respective buses 1015 and 1017. Bus 1015 and bus 1017 are preferably high-speed buses, such as PCI Express buses. In one embodiment, driver software 1005 residing in a memory coupled to CPU 205 includes a load-balancing algorithm that divides each graphics frame into two portions corresponding to different regions of a display. In one embodiment, the load balancing algorithm divides the frame into two contiguous sections corresponding to a first section processed by one GPU chip and a second section processed by the other GPU chip. As an illustrative example, the first portion may correspond to an upper section of a display whereas the second portion corresponds to a lower section of a display.

In one embodiment the load-balancing algorithm implemented by driver software 1005 dynamically adjusts the division of the frame into portions that are selected based upon an estimate of scene complexity throughout the frame and the capabilities of each GPU chip 1020 and 1040. This permits each GPU 1020 and 1040 to complete processing of their respective portions of a frame at about the same time, which facilitates the merger process. Thus, for example, in some frames the relative size of an upper frame portion and a lower frame portion processed in different GPU chips may be adapted so that each GPU chip 1020 and 1040 completes rendering its respective portion of a frame at about the same time.

Dynamic load balancing improves performance by, for example, facilitating processing a frame in the minimum time possible. Dynamic load balancing also facilitates merging results. By way of comparison a drawback with static division of a frame (e.g., 50% of the frame processed by one GPU and 50% of the frame processed by another GPU) is that in numerous graphics applications the graphics image is comparatively complex in one portion of each frame and comparatively simple in another portion. For example, in many graphics games some portions of a scene, such as the sky, have a low information content. However other portions of the scene, such as a ground level portion portraying game characters, may have a much higher information content. As a result a static division of each frame might result in one of the GPU chips processing its portion of the frame before the other GPU chip has finished processing the other portion of the frame. In this example, a static division results in inefficient use of processor resources. Dynamic load balancing, in contrast, adapts the size of each portion to balance the work performed by each GPU chip in processing each frame, resulting in improved performance.

In dynamic load balancing GPU chip 1020 must merge the results of the two GPUs even though the portions processed by each GPU vary from frame-to-frame. A variety of techniques may be used to identify to GPU chip 1020 the portion of the frame processed by the different processors. For example, the pixels stream received from GPU chip 1040 may include information identifying the portion of the frame that the transmitted pixels correspond to. Alternatively, GPU chip 1020 may receive information in its command stream indicating which portion of the frame is being processed by the different GPUs.

In one embodiment each GPU chip 1020 and 1040 includes logic 1029 for supporting dynamic load balancing. In a master mode, for example, logic 1029 supports merging data from GPU chips 1020 and 1040 into a single output 1035. In a slave mode, logic 1029 supports transmitting a pixel data stream from GPU chip 1040 to GPU chip 1020.

In one embodiment the load balancing algorithm implemented by driver software 1005 includes the capability to divide the frame into non-contiguous portions to achieve fine control of the load balancing. A particular frame of a graphics scene may, for example, vary in complexity/information across the scene. In one embodiment, driver software 1005 estimates the complexity of a scene across a frame and attempts to achieve load balancing by dividing the frame into two contiguous portions. However, if a load balancing efficiency is below a pre-selected threshold, the load-balancing algorithm determines if non-contiguous portions of the frame may be selected that provide the desired degree of load balancing. Thus, for example, while each GPU chip processes a different portion of the frame, in some frames a portion processed by a GPU chip may be a either a single contiguous region or a plurality of non-contiguous regions, depending upon which result provides better load balancing. Additionally, in some applications it may be desirable to assign each GPU 1020 and 1040 its portion of the process as a series of non-contiguous regions to facilitate the generation of a steady stream of work for each GPU chip.

GPU chip 1020 receives a first command stream from CPU 205 via bus 1015 corresponding to the first portion of the frame. GPU chip 1040 receives a second command stream from CPU 205 via bus 1017 corresponding to the second portion of the frame. In turn, GPU chip 1020 receives the first command stream in command module 1060. Command module 1060 allocates work to one or more internal processing modules 1065 to generate pixels for the first portion of the frame. GPU chip 1020 includes a memory interface 1070 to interface a graphics memory 1030 for performing frame buffer operations. GPU chip 1040 receives the second command stream in command module 1080. Command module 1080 allocates work to one or more internal processing modules 1085 to generate pixels for the second portion of the frame. GPU chip 1040 includes a memory interface 1090 for interfacing with a graphics memory 1095 for performing frame buffer operations.

GPU chip 1040 includes a first pixel link interface 1055-A whereas GPU chip 1020 includes a second pixel link interface 1055-B. A pixel link 1050 is formed between GPU chip 1040 and chip 1020 to permit pixels for the second portion of the frame to pass from GPU chip 1040 to GPU chip 1020. In one embodiment pixel link 1050 comprises a plurality of one-way sublinks for transmitting a pixel stream from GPU chip 1040 to GPU chip 1020. GPU chip 1020 merges its pixel data with the pixel data from GPU chip 1040 to generate display data 1035 for the entire frame. Pixel link 1050 and interfaces 1055-A and 1055-B are preferably configured for digital transmission of pixel data from GPU chip 1040 to GPU chip 1020. Consequently, in one embodiment pixel link 1050 is formed from a high bandwidth digital interconnect corresponding to a plurality of sublinks to provide the requisite aggregate bandwidth.

Pixel link 1050 may be formed using any of techniques to package a pair of chips with an interlink as previously described in regards to interlink 250 (e.g., edge-to-edge, flip-chip mounted to opposite side of a package, packaged on top of each other, or package-on-package). However, the bandwidth required to transmit pixels is comparatively low with respect to, for example, transmitting data between shader stages. For example, in one embodiment the bandwidth required to transmit a pixel data stream for half of a frame requires about 10 to 20 pins. Consequently, in one embodiment pixel link 1050 comprises a physical connector (not shown) connecting two separate GPU chips 1020 and 1040.

Figure 11:
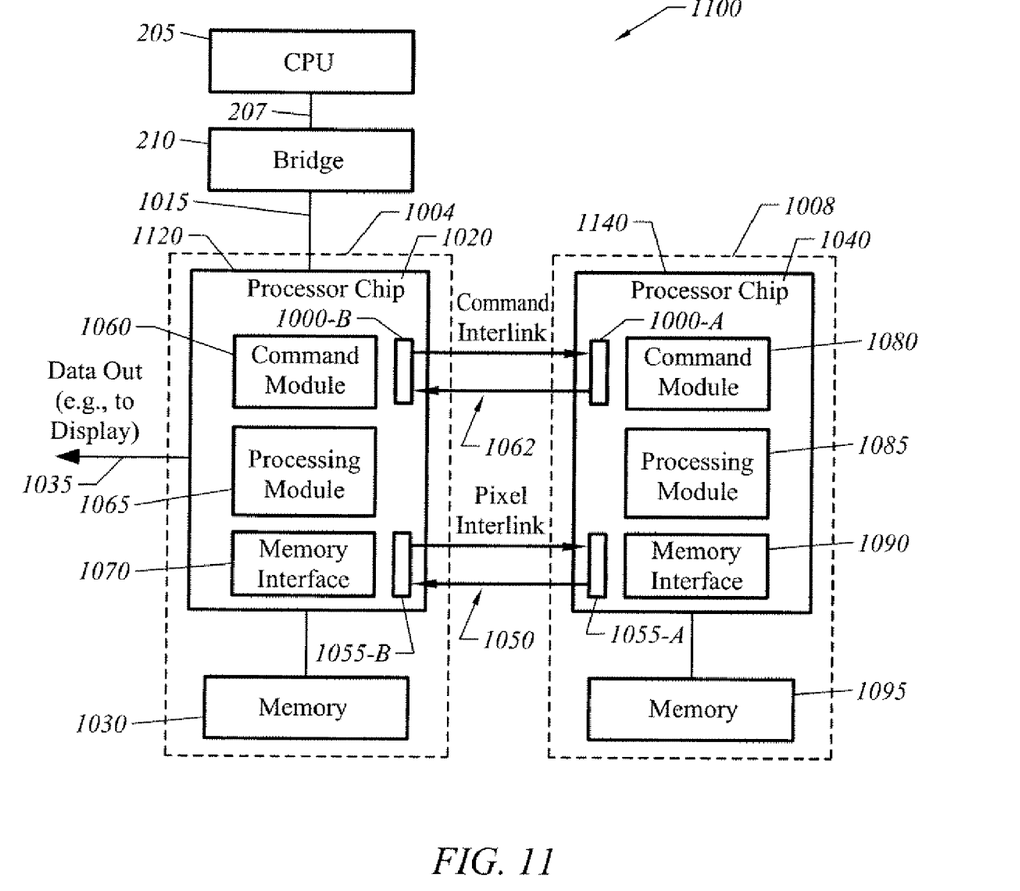
FIG. 11 is a block diagram illustrating a graphics system having distributed processing of pixels in two processors in accordance with one embodiment of the present invention; and Like reference numerals refer to corresponding parts throughout the several views of the drawings.

FIG. 11 illustrates another embodiment of a graphics system 1100. Graphic system 1100 has components similar to that of graphics system 1000. Additionally, graphics system 1100 has a command interlink 1062 for exchanging command information between respective command modules 1060 and 1080 of GPU chips 1020 and 1040. In this embodiment, master GPU chip 1120 may perform part of all of the dynamic load balancing calculations for dividing a frame into different frame sections and then distribute work for processing one of the frame sections to slave GPU 1040. A benefit of the embodiment of FIG. 11 is that it permits a peer-to-peer mode of operation in which the GPU chips 1020 and 1040 determine how to distribute the work of processing a frame.

While the embodiments described in regards to FIGS. 10-11 have been described in regards to dividing a frame into two continuous sections, more generally a frame may be divided into two or more different continuous sections corresponding to different regions of a display. It will thus be understood that it is contemplated that the intra-frame load balancing technique may be adapted to include dividing a frame into an integer number, n, of portions where $n \geq 2$. Additionally, it will be understood that the intra-frame load balancing technique of the present invention may be adapted to utilize more than two GPUs. For example, with three GPUs each frame may be divided into three sections with each GPU processing a different section of the frame and two of the GPUs digitally transmitting pixel data to a master GPU, which generates a display output for the entire frame.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A multi-chip graphics system for augmenting performance of a graphics processor using a partial defective graphics processor, comprising:

a first graphics processing unit (GPU) chip configured as a master GPU chip, the master GPU chip having a first set of graphics stages including a first command module stage to receive a graphics command string from a central processing unit and in response generate a graphics output, said master GPU chip having a first version of a processing stage having a first group of parallel processing units, said master GPU chip including a first interlink interface;

a second graphics processing unit GPU chip having a second set of graphics stages identical to said first set of graphics stages except that at least one stage has a defect that results in said second GPU chip not satisfying a performance criteria for performing a full sequence of steps for rendering an image, the second GPU chip configured as a slave GPU chip, the slave GPU chip having a second command module that is inoperative during normal use of the multi-chip graphics system, said slave GPU chip including an operative second version of said processing stage having a second group of parallel processing units and a second interlink interface, said slave GPU chip receiving graphics data from said master GPU chip for parallel processing in said second group of parallel processing units and processing said graphics data in parallel on behalf of said master GPU chip to improve performance of said master GPU chip; and said master GPU chip and said slave GPU chip packaged with a high bandwidth interlink for exchanging data and commands between said master GPU chip and said slave GPU chip, the high bandwidth interlink having a sufficient bandwidth such that said second version of said processing stage acts as an extension of said first version of said processing stage;

the master GPU chip commanding the slave GPU chip via the high bandwidth link and utilizing said second version of said processing stage to increase an effective number of parallel processing units of said first version of said processing stage acting in parallel to process data;

wherein the slave GPU chip extends the capability of only a subset of stages in said master GPU chip.

2. The multi-chip graphics system of claim 1, wherein said system performs a shading operation in parallel using a first shader stage in said master GPU chip and a second shader stage in said slave GPU chip.

3. A multi-chip graphics system for augmenting performance of a graphics processor using a partially defective graphics processor, comprising:

a first graphics processing unit (GPU) chip receiving a graphics command string from a central processing unit and generating a graphics output, said first GPU chip including a first set of graphics stages including a first stage for implementing a parallel processing operation on graphics data received by said first stage;

a second graphics processing unit (GPU) chip having a second set of graphics stages identical to said first set of graphics stages except that at least one stage has a defect that results in said second GPU chip not satisfying a performance criteria for performing a full sequence of steps for rendering an image, the second GPU chip including a slave mode control module activated such that said second GPU chip is configured to act as a slave to said first GPU chip, said second GPU chip including a second stage for performing said parallel processing operation; and an interlink configured to send data and commands from said first stage of said first GPU chip to said second stage of said second GPU chip and to return processed data from said second stage of said second GPU chip to said first stage of said first GPU chip the interlink having a sufficient bandwidth such that said second stage of said second GPU chip acts as an extension of said first stage of said first GPU chip;

wherein said graphics system is configured to process said graphics data in parallel via said first stage and said second stage with said second stage operating as an extension of said first stage with said second GPU chip extending the capability of only a subset of stages in said first GPU chip;

wherein the first GPU chip commands the second GPU chip via the interlink and only the first GPU chip receives the command string from the central processing unit.

4. The multi-chip graphics system of claim 3, wherein said first GPU chip and said second GPU chip are fabricated from the same design.

5. The multi-chip graphics system of claim 4, wherein said first stage is a first shader stage having parallel shader pipelines and said second stage is a second shader stage having parallel shader pipelines.

6. The multi-chip graphics system of claim 3, wherein said first GPU chip and said second GPU chip are packaged parallel and in close proximity to each other with said interlink comprising a plurality of conductive leads for communicating signals between said first GPU chip and said second GPU chip.

7. The multi-chip graphics system of claim 6, wherein said first GPU chip and said second GPU chip are mounted to opposed sides of a coreless substrate.

8. The multi-chip graphics system of claim 6, wherein said first GPU chip and said second GPU chip are mounted to each other using three-dimensional packaging techniques.

9. The multi-chip graphics system of claim 3, wherein the CPU is coupled only to said first GPU chip such that the graphics commands are received only by the first GPU chip and a graphics memory is coupled to only said first GPU chip and said system is configured to utilize said graphics memory as a unified memory for both said first GPU chip and said second GPU chip.

10. A graphics processing unit (GPU) chip, comprising:
a command module;
a set of graphics stages including a stage for performing a processing operation capable of being performed in parallel;
a slave mode control module operative to configure the GPU chip to act as a slave CPU chip for a selected subset of graphics stages in the event that at least one other stage has a defect that results in said GPU chip not satisfying a performance criteria for performing a full sequence of steps for rendering an image;

a memory interface for interfacing with a graphics memory; and an interface configured to permit an interlink to be established with another GPU chip to exchange data and commands;

said GPU chip configured to have a normal operating mode, a master mode, and a slave mode, wherein in said normal operating mode said GPU chip is operable as an individual processor, in said master mode said GPU chip utilizes said interlink to have said another GPU chip perform said processing operation in parallel, and in said slave mode said GPU chip receives data to be processed in said stage on behalf of said another GPU chip;

wherein said GPU chip is operable as an individual GPU chip or as part of a multi-chip module with said another GPU chip and wherein in a multi-chip module the interlink has sufficient bandwidth such that said slave GPU chip acts as an extension of said stage of said master with the master using the slave to increase an effective number of parallel processing units in said stage acting in parallel to process data.

11. The GPU chip of claim 10, wherein said stage is a shader stage.

12. The GPU chip of claim 10, wherein said interface serializes output data prior to transmission on said interlink.

13. The GPU chip of claim 10, wherein said interface deserializes input data received from said interlink.

14. The GPU chip of claim 10, wherein said GPU chip is packaged with said another GPU chip and one of said GPU chip and said another GPU chip operates as a slave and the other as a master.

15. A multi-chip graphics system for augmenting performance of a graphics processor using a partially defective graphics processor, comprising:

a first graphics processing unit (GPU) chip for receiving a graphics command string from a central processing unit and generating a graphics output, said first GPU chip including a first set of graphics stages including a first shader stage receiving graphics data to be shaded;

a second graphics processing unit GPU chip including a second set of graphics stages including a second shader stage, at least one of said second set of graphics stages other than said second shader stage having a defect that results in said second GPU chip not satisfying a performance criteria for performing a full sequence of steps for rendering an image; and said first GPU chip and said second GPU chip packaged in parallel to each other with leads for forming a high bandwidth interlink for sending data from said first GPU chip to said second GPU chip and returning processed data from said second GPU chip to said first GPU chip the interlink having sufficient bandwidth such that said second shader stage of said second GPU chip acts as an extension of said first shader stage of said first GPU chip;

wherein said first GPU chip is configured as a master and said second GPU chip is configured as a slave, said master allocating a first portion of said graphics data to be shaded in said first shader stage of said first GPU chip and a second portion of said graphics data to be shaded in parallel using said second shader stage of said second GPU chip;

the master utilizing said second shader stage of said slave to increase an effective number of parallel shading units of said first shader stage acting in parallel to process data the slave extending the capability of only a subset of stages in said master;

wherein the first GPU chip commands the second GPU chip via the high bandwidth interlink and only the first GPU chip receives the graphics command string from the central processing unit.

16. The multi-chip graphics system of claim 15, wherein only the first GPU chip performs geometry processing.

17. The multi-chip graphics system of claim 16, wherein the second GPU chip is used only to augment shading performance of the first GPU chip.

18. The multi-chip graphics system of claim 15, wherein only the first GPU chip performs raster operations.

19. The multi-chip graphics system of claim 15, wherein the second GPU chip does not have an operative geometry processing stage, does not have a raster operation stage, and does not write data to a frame buffer.

* * * * *